US012011400B2

(12) United States Patent
Paillet

(10) Patent No.: US 12,011,400 B2
(45) Date of Patent: Jun. 18, 2024

(54) POWERED ASSISTANCE ADD-ON DEVICE FOR IMPROVED OPERATION OF A MANUAL WHEELCHAIR

(71) Applicant: Christopher Paillet, Los Angeles, CA (US)

(72) Inventor: Christopher Paillet, Los Angeles, CA (US)

( * ) Notice: Subject to any disclaimer, the term of this patent is extended or adjusted under 35 U.S.C. 154(b) by 0 days.

(21) Appl. No.: 17/818,351

(22) Filed: Aug. 8, 2022

(65) Prior Publication Data

US 2024/0041674 A1 Feb. 8, 2024

(51) Int. Cl.
*A61G 5/04* (2013.01)

(52) U.S. Cl.
CPC ............. *A61G 5/047* (2013.01); *A61G 5/045* (2013.01); *A61G 2203/14* (2013.01)

(58) Field of Classification Search
None
See application file for complete search history.

(56) References Cited

U.S. PATENT DOCUMENTS 2,798,565 A * 7/1957 Rosenthal ............ A61G 5/0825 180/68.5
4,050,533 A * 9/1977 Seamone ............. A61G 5/1054 180/907
5,234,066 A * 8/1993 Ahsing ................ A61G 5/0825 340/870.37
6,547,018 B1 * 4/2003 Choi .................... A61G 5/1054 180/65.6
9,474,665 B1 * 10/2016 Chan ...................... A61G 5/125
10,849,803 B2 * 12/2020 Shim .................... A61G 5/1054
2007/0080003 A1 * 4/2007 Koerlin .................. A61G 5/045 180/907
2010/0331081 A1 * 12/2010 Holenweg ............ A61G 5/1094 463/30
2018/0236913 A1 * 8/2018 Abreu ...................... B60N 2/26
2018/0353356 A1 * 12/2018 Shim ...................... A61G 5/047
2020/0077264 A1 * 3/2020 Studer ................... H04L 63/105
2020/0170856 A1 * 6/2020 Pettee ...................... A61G 5/10
2020/0315878 A1 * 10/2020 Penski ................... A61G 5/048
2022/0202633 A1 * 6/2022 Peskin ................... A61G 5/047

FOREIGN PATENT DOCUMENTS

CH 649464 A5 * 5/1981
CN 112572580 A * 3/2021
CN 112869972 A * 6/2021
CN 113320585 A * 8/2021
(Continued)

*Primary Examiner* — James A Shriver, II
*Assistant Examiner* — Ian Bryce Shelton
(74) *Attorney, Agent, or Firm* — University of Arizona IP

(57) ABSTRACT

An apparatus for powering a manual wheelchair with rear wheels that includes a motor and pair of powered drive wheels, with each powered drive wheel in contact with a respective rear wheel of the manual wheelchair. Some embodiments of the powered apparatus include a piston assembly coupled to each of the powered drive wheels, whereby movement of the piston assembly to a disengaged position ceases motorized control of the wheelchair. The piston assembly may also be utilized as a "build-in" emergency stopping feature for motorized wheelchairs. A controller for operating the powered apparatus also is contemplated.

12 Claims, 9 Drawing Sheets

(56) References Cited

FOREIGN PATENT DOCUMENTS

| | | | | | |
|---|---|---|---|---|---|
| DE | 4202687 | A1 | * | 8/1993 | ............. A61G 5/045 |
| ES | 2902511 | A1 | * | 3/2022 | |
| KR | 20100082425 | A | * | 7/2010 | |
| KR | 101935716 | B1 | * | 1/2019 | |
| WO | WO-2019198884 | A1 | * | 10/2019 | ............. A61G 5/041 |

* cited by examiner

POWERED ASSISTANCE ADD-ON DEVICE FOR IMPROVED OPERATION OF A MANUAL WHEELCHAIR

FIELD OF THE DISCLOSURE

This disclosure relates to a power add-on device for a manual wheelchair.

BACKGROUND

Many individuals with spinal cord injuries require the assistance of a wheelchair for mobility. Manually-operated wheelchairs can be physically taxing to operate for long periods of time, especially outdoors and in extreme elements. Electric wheelchairs alleviate some of the difficulties associated with manual wheelchairs but can be prohibitively expensive for many potential users.

Several patents disclose devices capable of electrically powering a manual wheelchair. For example, U.S. Pat. No. 8,684,113 to Laconis, entitled "Attachable, Powered Drive Apparatus for Wheelchairs," discloses an assembly consisting of a single powered wheel and a steering column attached to the front of a manual wheelchair. Another patent, U.S. Pat. No. 9,144,525 to Richter, entitled "Motion Assistance System for Wheelchairs," discloses a drive wheel attached to at least one point on the manual wheelchair. Yet another patent, KR101017146B1, discloses a pair of drive wheels attached to each rear wheel of the manual wheelchair.

Although such inventions can be useful and provide powered assistance, they fail to provide quick mobility, for long ranges, over a variety of terrains. Moreover, while these devices themselves typically do not contact the existing wheels of the manual wheelchair, even those devices which do contact the wheels lack the ability to quickly shift between manual and powered operation.

SUMMARY OF THE DISCLOSURE

Embodiments described herein may include two elements that are attached to a manual wheelchair: a structural assembly that houses the power add-on device and a controller for operating the device. The structural assembly is attached such that a portion of the assembly, namely, the drive wheels, contacts the rear wheels of the manual wheelchair to provide powered assistance via frictional force. A controller is attached to the wheelchair such that a user sitting in the wheelchair can control the structural assembly. Of course, some embodiments could be "built-in" to a wheelchair such that nothing in this disclosure should be read to limit the application of the embodiments to an "add-on" or aftermarket device.

In one embodiment, the structural assembly is attached to the wheelchair in a fixed position behind the backrest of the wheelchair. The structural assembly is further positioned such that each of the drive wheels are in contact with one of the set of rear wheels of the wheelchair. The structural assembly includes a frame and a cover attached via a hinge such that the cover swings up to open and swings down to close. The frame houses several other elements of this embodiment, including at least one of each of the following: a power source, a piston assembly, a motor, a single-board computer, a temperature sensor, and a cooling fan. In one embodiment, the frame also contains two holes positioned on opposite sides of the frame facing the rear wheels of the wheelchair. In certain embodiments, the frame also contains two male latches positioned facing the rear wheels, and the cover contains at least one venting hole to regulate the temperature inside the structural assembly.

In one embodiment, the structural assembly is attached to the wheelchair via a top mount and bottom mount. The top mount comprises two strap assemblies each further comprising a strap mount, at least two pieces of webbed strap, and a side release buckle with a male and female portion. Each top mount is connected to a frame hole facing the rear wheels. The bottom mount comprises two rigid structures each further comprising a clamp and a female latch. The female latch attaches to the male latch on the frame.

In one embodiment, the controller is attached to the armrest of the wheelchair. The controller in this embodiment comprises a joystick, a "start" button, a "stop" button, and an "emergency stop" button.

In the above and other embodiments, the drive wheels act upon the rear wheels of the wheelchair in response to one or more electric motors. The motors turn the drive wheels using a gear assembly. The drive wheels, in contact with the rear wheels, generate a frictional force that turns the rear wheels without manual operation. The motors are in operational connection with a power source. In one embodiment, the power source is a battery.

Some embodiments also include two piston assemblies that can rapidly disengage the gear assembly to prevent the motor from acting upon the drive wheels, thereby quickly halting any powered assistance of the manual wheelchair. Each piston assembly is in contact with one motor and drive wheel through a gear assembly. Each piston assembly includes a linear actuator and a gear holder. The embodiments featuring a piston assembly could be "built in" to a motorized wheelchair rather than being part of an add-on or aftermarket device.

Many embodiments are operated by the user using the controller. The controller may utilize existing short-range wireless technology to communicate with the motorized components via a single-board computer. By way of example, in one embodiment, the controller contains a Bluetooth transceiver to interact with a Raspberry Pi computer attached to the frame. The controller includes a base to be attached to the wheelchair. The controller may be powered using AAA batteries and contains a battery indicator light.

DETAILED DESCRIPTION OF THE DISCLOSURE

With reference to FIG. 1 and FIGS. 6-10, the powered device 100 is housed within a frame 101. A cover 102 opens and closes allowing for inspection of the contents of the device within the frame. Closure latches are attached to the frame 101 and cover 102, respectively, such that the cover 102 may securely fasten to the frame when closed. The cover 102 may include a series of cooling vents 161 to allow the powered device 100 to operate at optimal temperatures.

Figure 7:
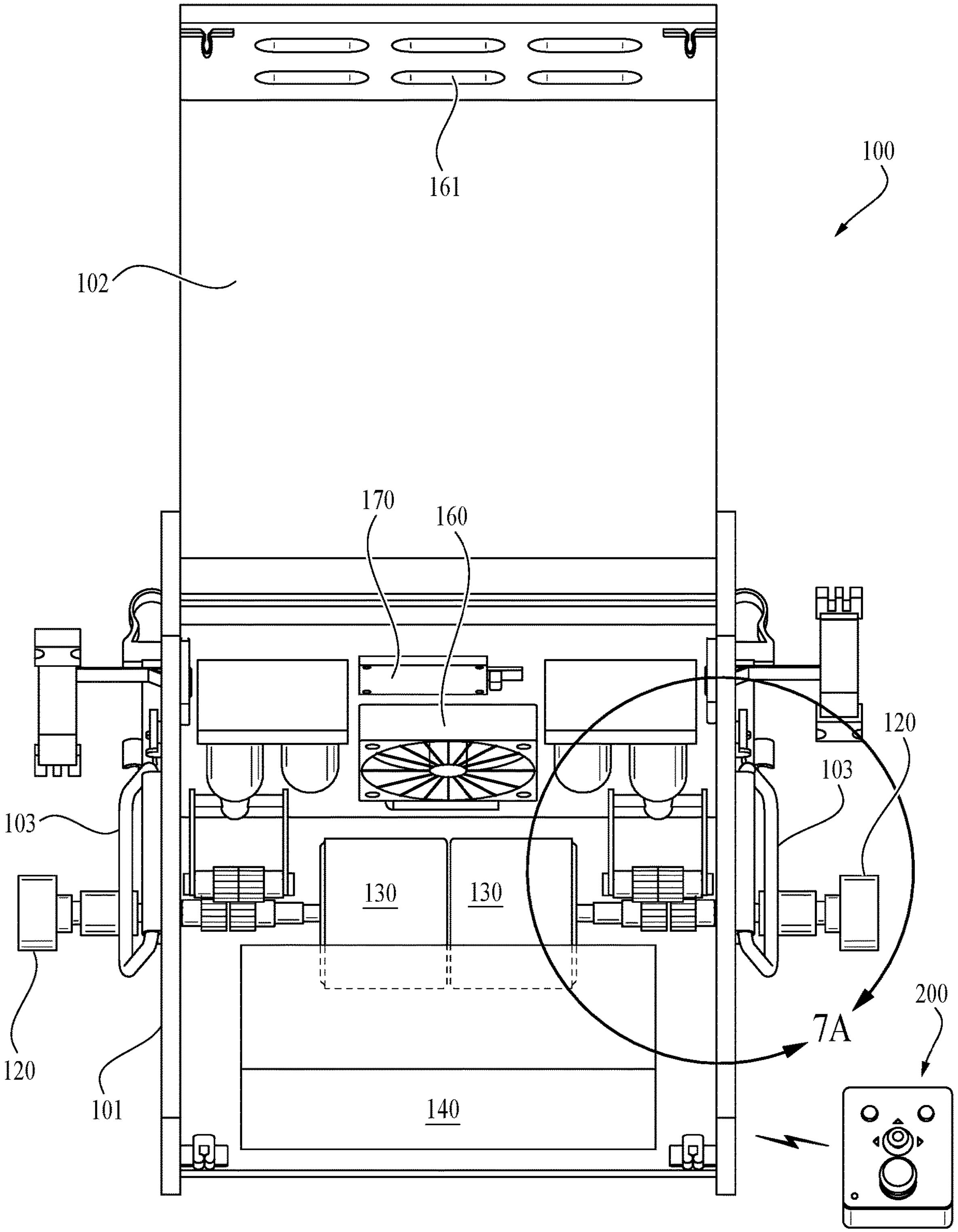
FIG. 7 is a top view of the device shown in FIG. 1 and with the structural assembly open to show interior details.
Figure 8:
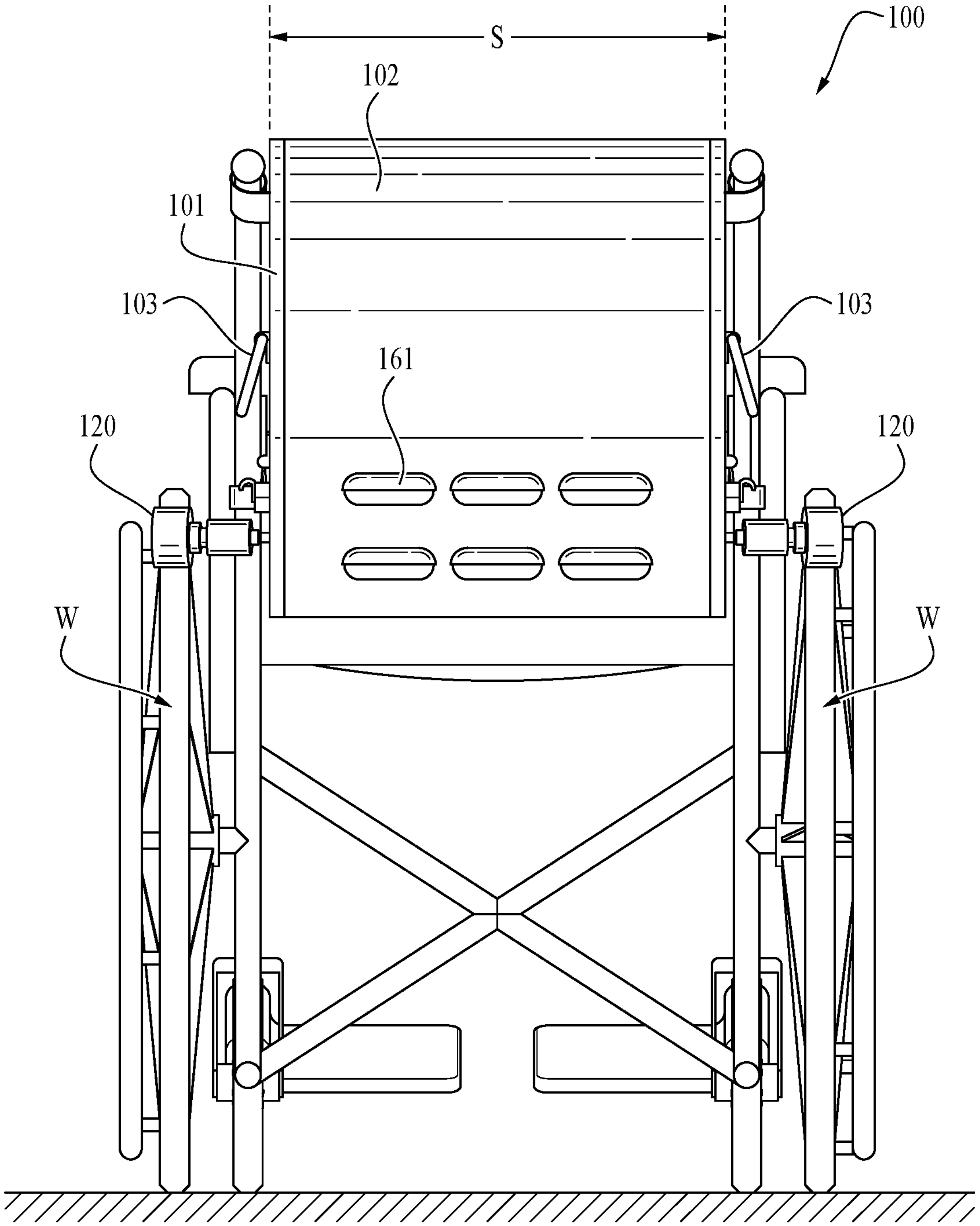
FIG. 8 is a rear view of the device shown in FIG. 1 attached to a manual wheelchair.
Figure 9:
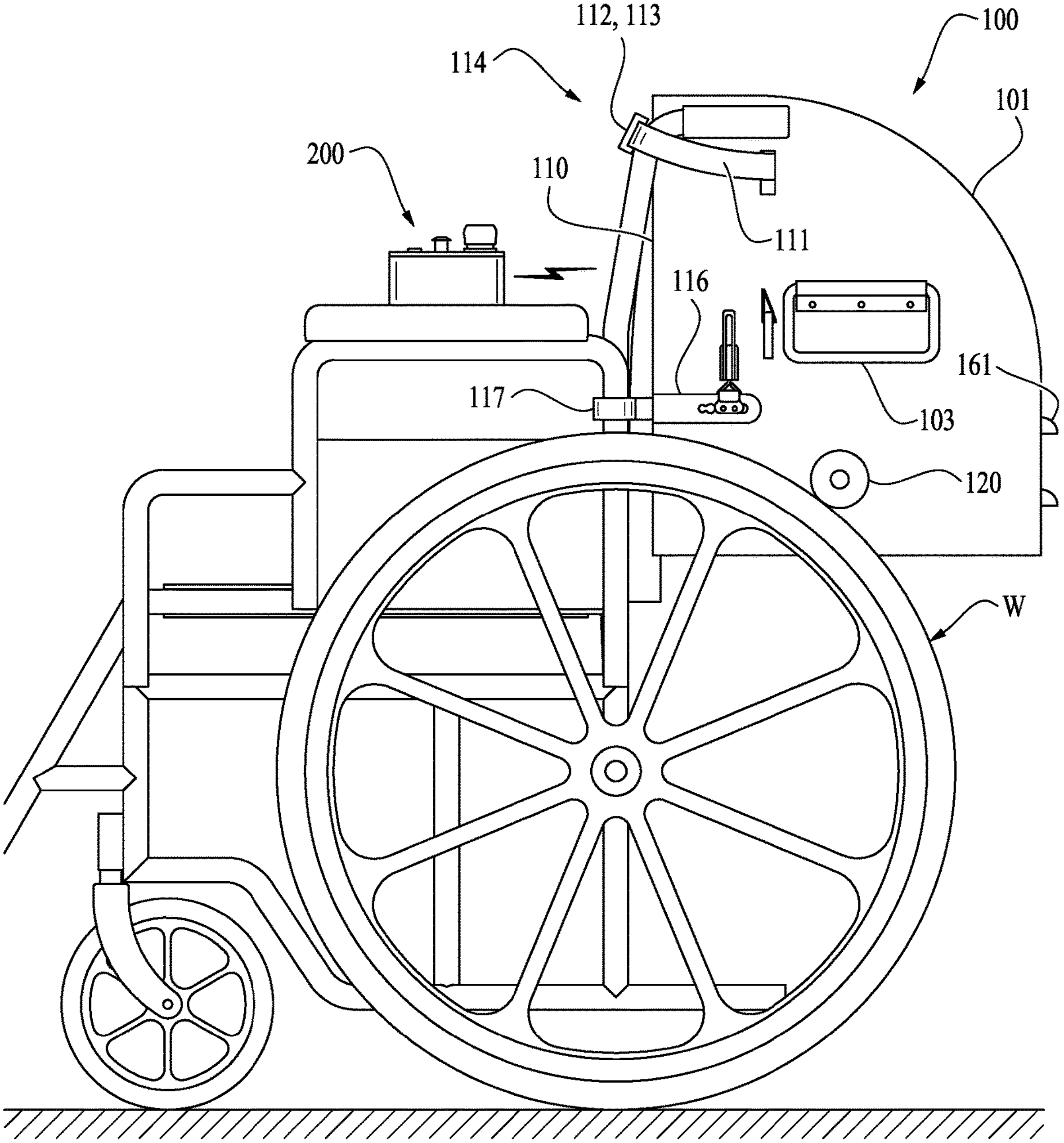
FIG. 9 is a side view of the device shown in FIG. 1, as well as the controller in FIG. 2, attached to a manual wheelchair.
Figure 10:
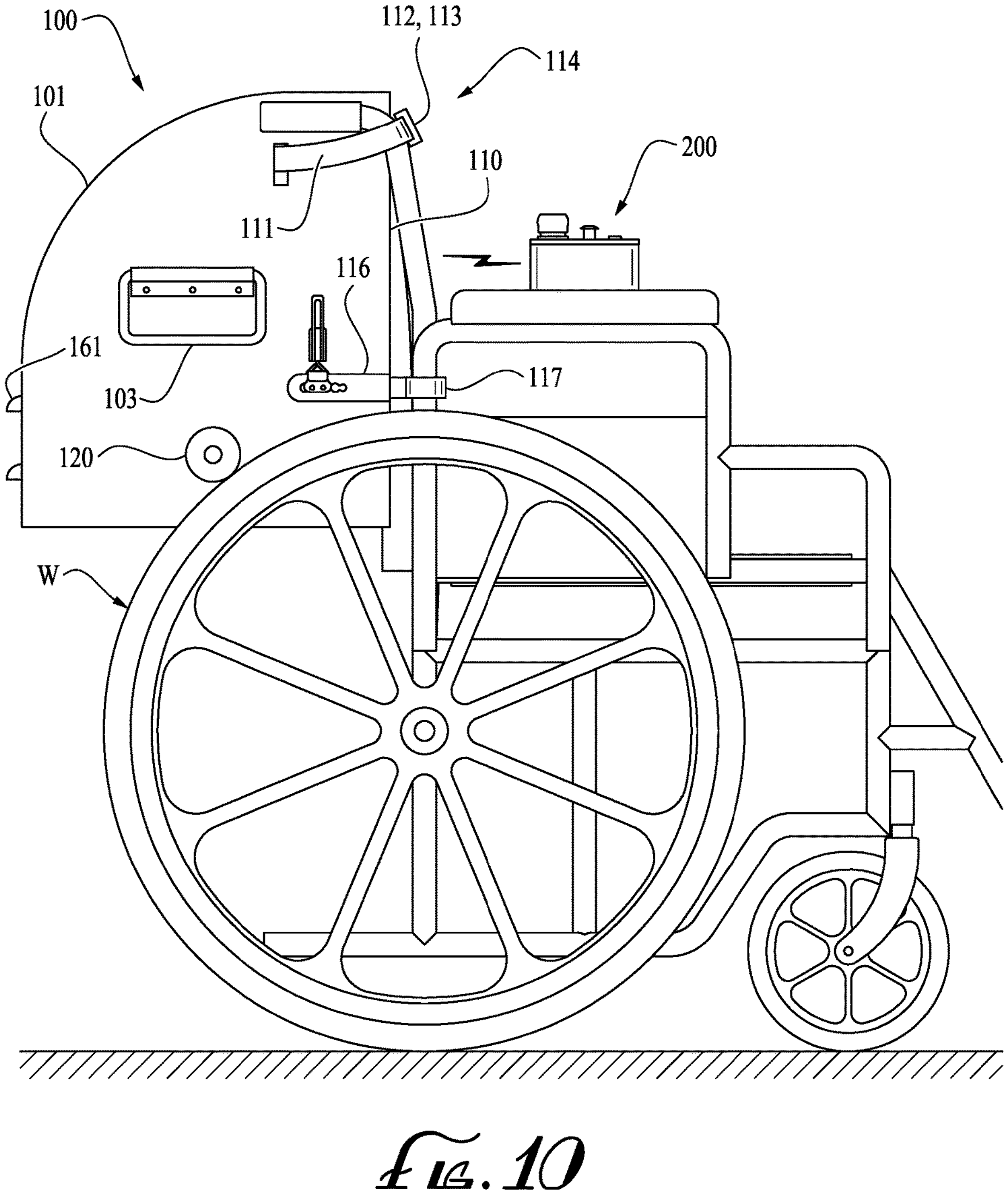
FIG. 10 is another side view of the device shown in FIG. 1, as well as the controller in FIG. 2, attached to a manual wheelchair.

Handles 103 are attached on the left and right side of the frame. These handles allow for the powered device to be easily attached onto and removed from the wheelchair. The latching system 110 may include a top mount 111, attached to or near the handlebars of a wheelchair used to manually push a wheelchair user, and a bottom mount 116, attached to the vertical bars of the wheelchair on the left and right sides of the back seat of the wheelchair. Each top mount 111 may include two pieces of webbing, wherein one piece of webbing is attached on one end to a male strap clip 112 and on the other end to a female strap clip 113, such that the ends of the webbing may lock into a secure loop. The top mount 111 may further include the second piece of webbing with one end attached perpendicularly to the first piece of webbing and the other end attached to one of a set of strap mounts 114. The strap mounts may be affixed to the outer sides of the powered device 100, such that the top mount 111 securely attaches the powered device to the manual wheelchair. With reference to FIGS. 7-9, each bottom mount 116 may include a clamp and a female main latch 117. The female main latch 117 may attach to a male latch 118 affixed to the outer sides of the powered device 100.

The power add-on device includes a powered device 100 mounted onto the back of the wheelchair and controller 200 for controlling the device (for example, see FIGS. 2-5). The powered device 100 includes a set of motors 130 that each apply a rotational force to one of a set of drive wheels 120. A cooling fan 160 facilitates an optimal operating temperature by forcing air out of the powered device 100 via a set of vents 161 on the cover 102 of the powered device 100. A power system comprising a battery 140 supplies power to the control system 170, the dual electric motors 130, and to the cooling fan 160. The control system is a computer with electrical circuits that are tied to the various electrical components and include a wireless control interface.

The drive wheels receive rotational force from the motor via the gearbox. The motor applies a rotational force that is transmitted through the bevel gear assembly to the piston assembly, and then transmitted from the piston assembly to the drive wheel assembly. The drive wheels then transmit their own rotational force to the wheels of the wheelchair.

Figure 7A:
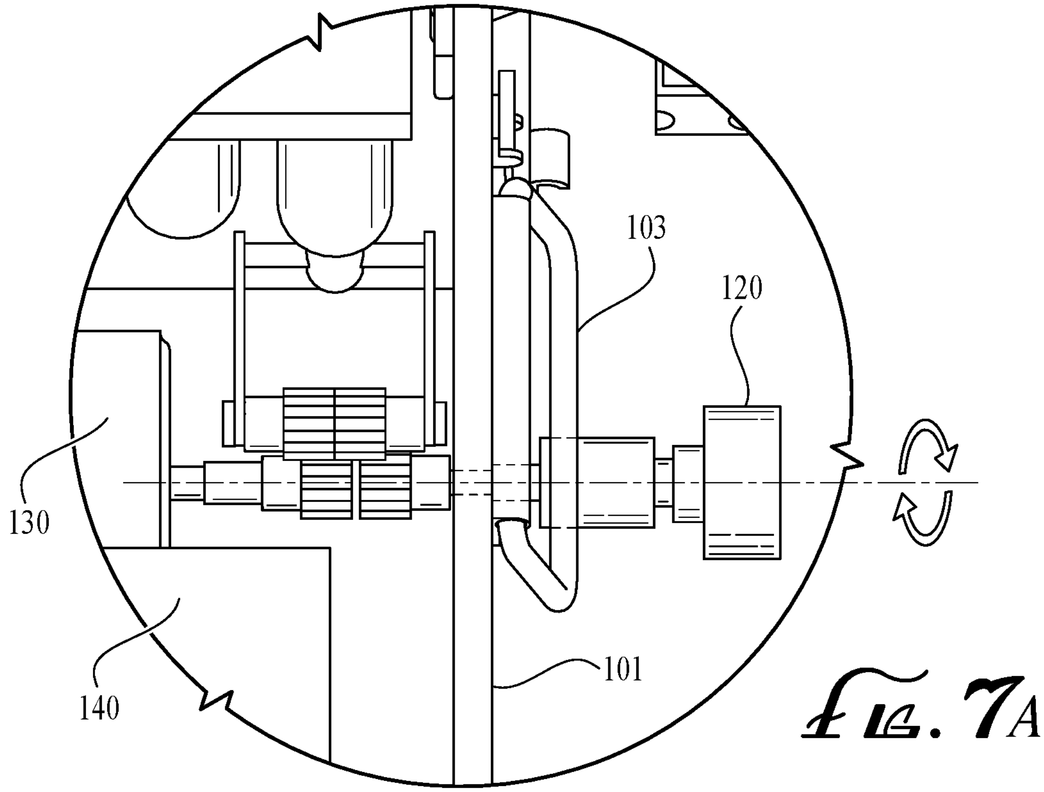
FIG. 7A depicts an enlarged detail area in which a piston is positioned for the drive gears to be engaged, thereby enabling powered movement of the wheelchair wheels.
Figure 7B:
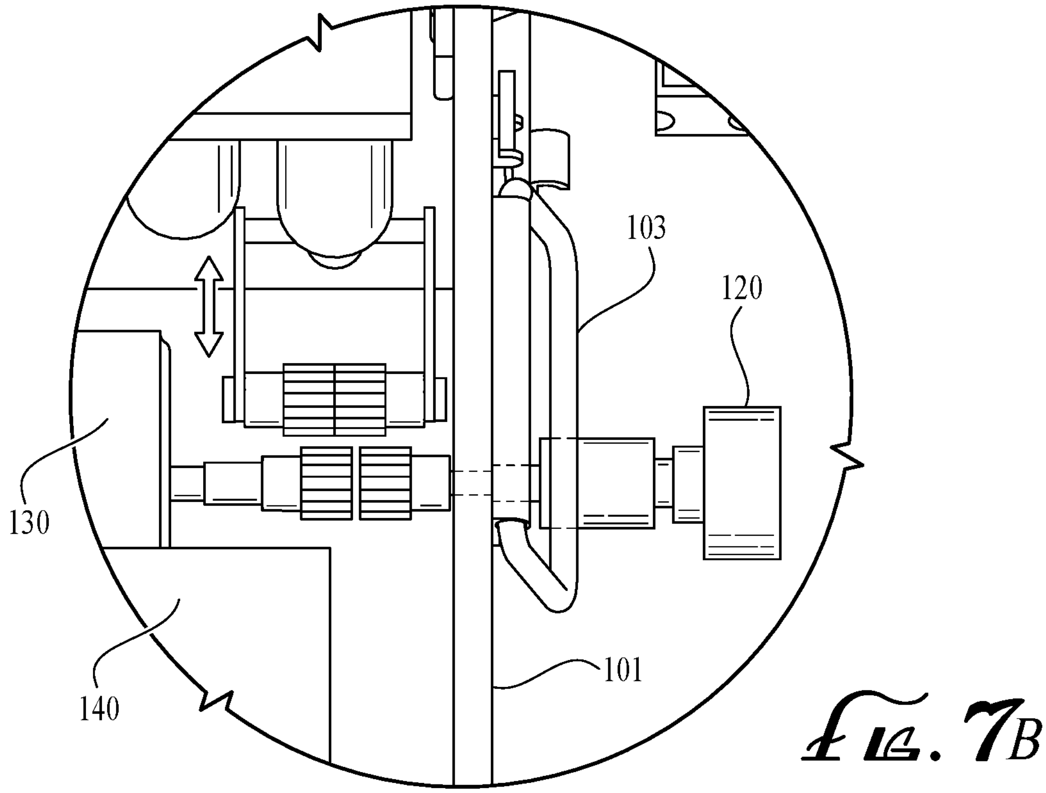
FIG. 7B illustrates an enlarged detail area in which a piston is positioned for the drive gears to be disengaged, thereby preventing powered movement of the wheelchair wheels.

In one embodiment, the motors 130 apply a force to the drive wheels 120 via a set of disassociated shafts. Each of the motors 130 are connected to a shaft internal to the structural assembly 100. Meanwhile, each of the drive wheels 120 are connected a separate shaft which protrudes out from the structural assembly 100 to allow the drive wheels to contact the rear wheels of the wheelchair. Each shaft is connected to a bevel gear. There is a small gap between the bevel gears. In this embodiment, the piston assembly contains a bevel gear such that, when the piston assembly is engaged (FIG. 7A), the motors 130 can apply a rotational force to the drive wheels 120 via the bevel gear assembly. However, when the piston assembly is disengaged (FIG. 7B), the motors 130 cannot apply a rotational force to the drive wheels 120 via the bevel gear assembly.

Figure 1:
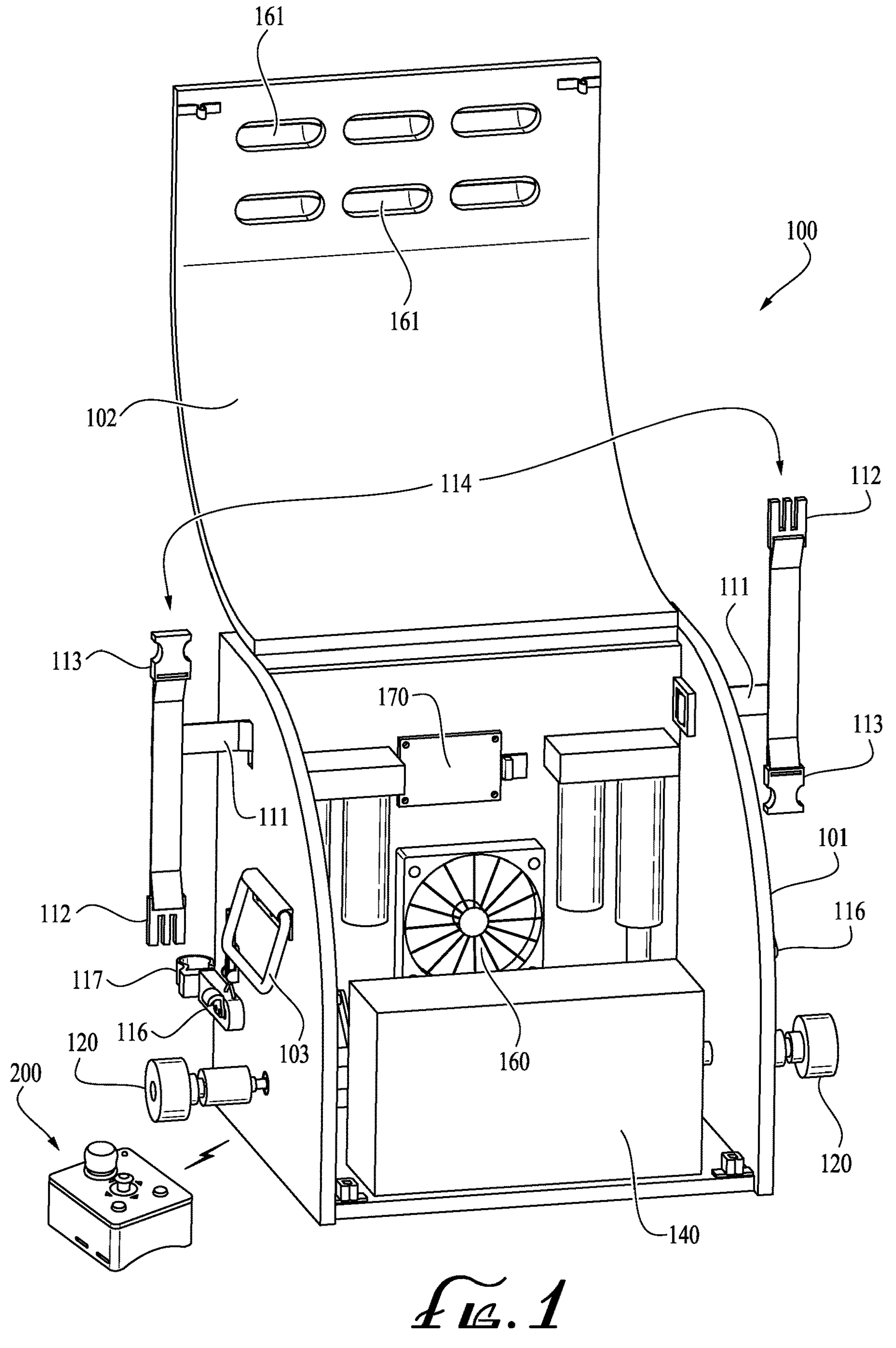
FIG. 1 is a front perspective view of the power add-on device for a manual wheelchair.
Figure 2:
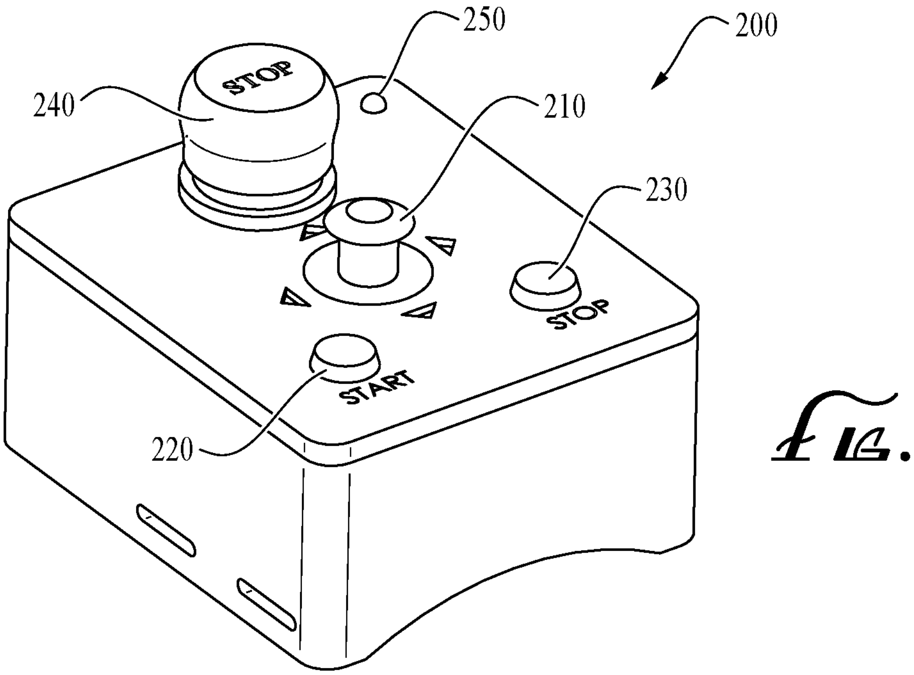
FIG. 2 is a perspective view of a controller for the power add-on device.
Figure 3:
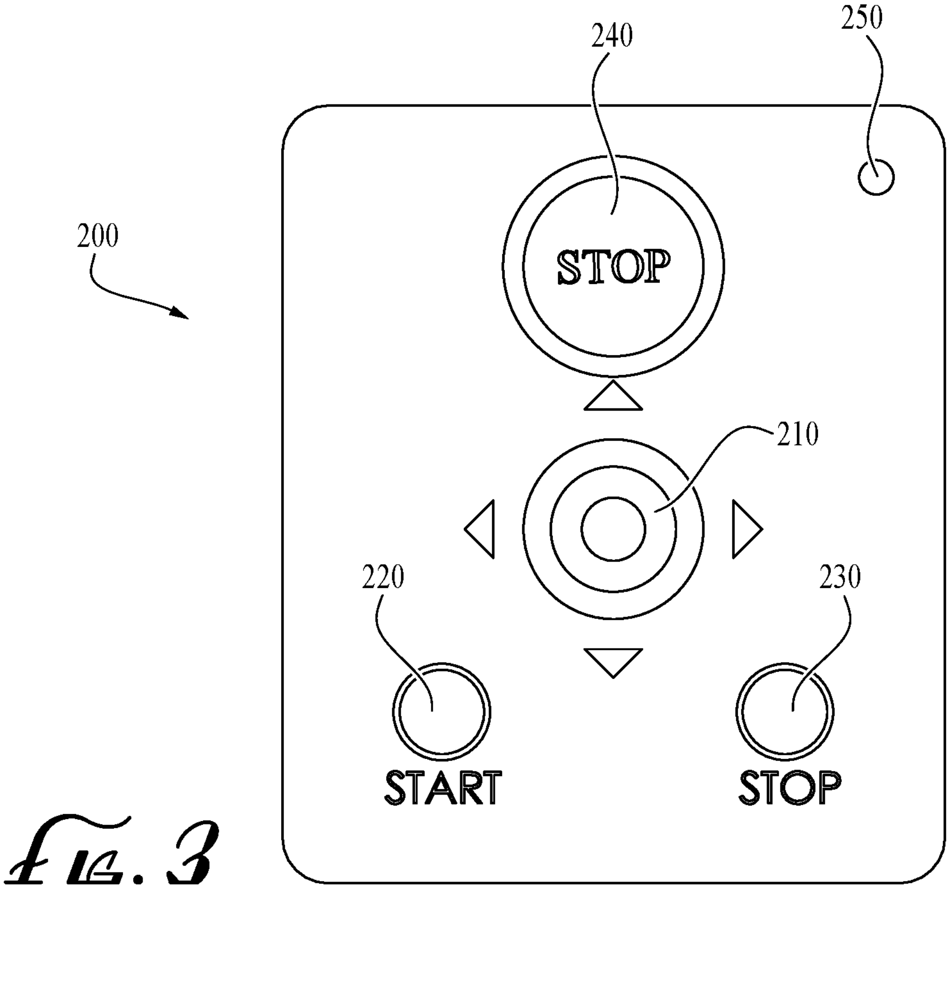
FIG. 3 illustrates a top view of the controller shown in FIG. 2.
Figure 4:
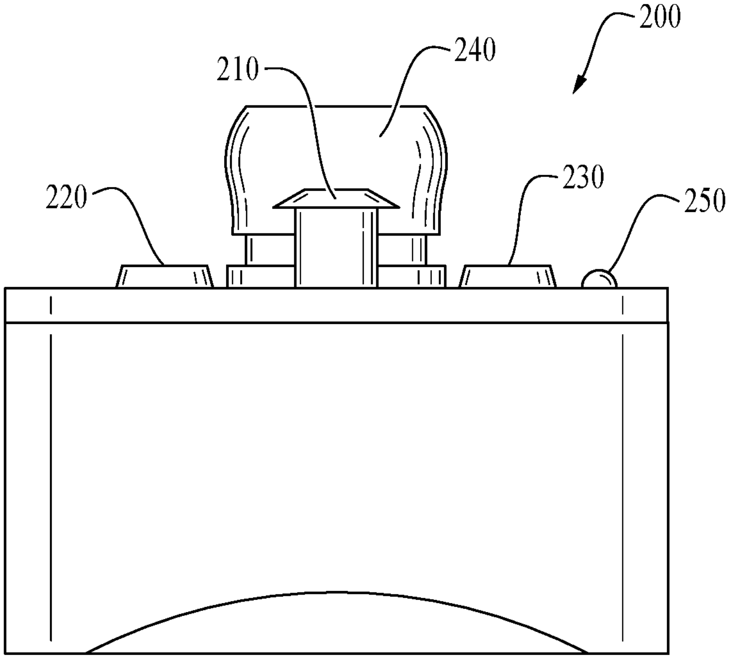
FIG. 4 depicts a front view of the controller shown in FIG. 2.
Figure 5:
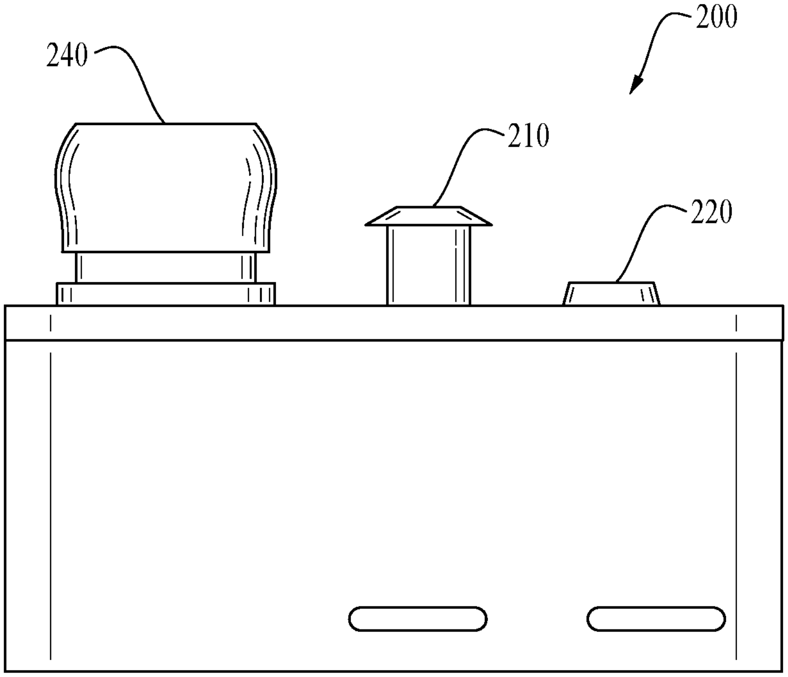
FIG. 5 shows a side view of the controller shown in FIGS. 2-4.
Figure 6:
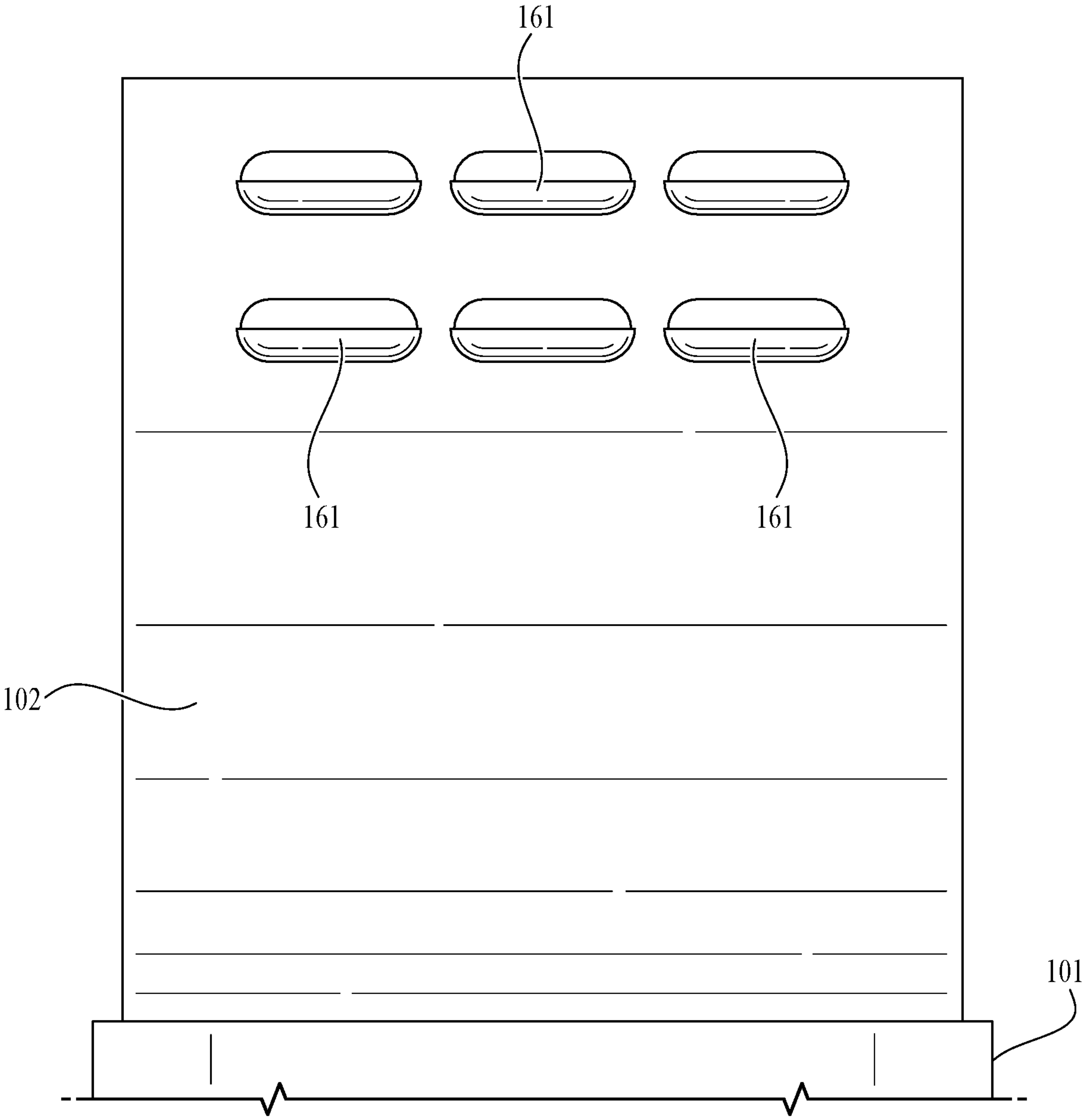
FIG. 6 shows a front view of the device shown in FIG. 1 with its cover closed.

With reference to FIG. 2, the controller 200 includes a joystick 210, a “start” button 220, a “stop” button 230, an “emergency stop” button 240, and a battery indicator light 250. The user may operate the joystick to select forward or reverse motion, directional turning, and speed. The controller 200 may be powered using one AAA battery. The “start” button enables the control system to send power to one or both drive wheels. The “stop” button suspends power. The “emergency stop” button sends a signal to the control system to activate the piston disengagement assembly. When the “emergency stop” button is activated, the piston disengagement assembly removes the piston bevel gear from contact with the motor bevel gear and drive wheel bevel gear. This removal precents any rotational force from being translated from the motor to the drive wheel, and thus stops the powered assistance of the manual wheelchair.

With reference to FIG. 8, the powered device 100 may span the width of the seat S of the wheelchair. The powered device 100 securely attaches to the wheelchair via a latching system 110. The latching system 110 may include a top mount 111 and bottom mount 116. By securely attaching the powered device 100 to the wheelchair, the latching system 110 facilitates the frictional force needed to transfer power from the device 100 to the wheels W of the wheelchair via the drive wheels 120.

The present embodiments improve upon the related art by allowing the user to manually operate the wheelchair without removing the powered device 100. When the piston assembly is disengaged, the spaced bevel gears prevent any rotational force from being transmitted from the motors 130 to the drive wheels 120. Furthermore, the disassociated shafts enable the drive wheels to move freely when the piston assembly is disengaged. Thus, when the device is shifted to “stop” or “emergency stop” mode, the drive wheels will freely move in response to a user’s manual operation of the wheelchair. In other words, the user need not adjust or remove the powered device 100 to operate the wheelchair manually.

These advancements over the related art increase the safety of the user and the efficiency of the device. In prior systems that apply drive wheels to the rear wheel of the manual wheelchair, the drive wheels must be physically removed from the rear wheel to switch to manual assistance. This is because, unlike the embodiments herein, the related art does not utilize drive wheels that can freely rotate on the rear wheel when the device is powered off. Thus, if a related art device were suddenly switched off, the user would experience a sudden lurch caused by the rigid deactivated drive wheels in contact with the rear wheels. With the present disclosure, however, the freely rotating drive wheels allow a user to slowly decelerate in the wheelchair using their combined body weight with the weight of the wheelchair.

Furthermore, where the related art requires the user to manually adjust the device to switch between powered assistance and manual operation of the wheelchair—a process that can require several seconds or minutes, or require the assistance of another person, for each adjustment—the present disclosure allows the user to quickly toggle between powered and manual assistance using the controller 200 without adjusting the device itself and takes a fraction of the time to complete, versus the related art.

What is claimed is:

1. A device for powering a manual wheelchair with rear wheels, comprising:

a powered apparatus providing motorized assistance to a user operating the manual wheelchair, the powered apparatus comprising a motor and pair of powered drive wheels, with each powered drive wheel coupled with a respective rear wheel of the manual wheelchair; and the motor is in contact with a first shaft and first gear that is disassociated from a second shaft and second gear attached to a respective drive wheel.

2. The invention of claim 1, further including a controller for operating the powered apparatus.

3. The invention of claim 1, wherein the powered apparatus includes a piston assembly coupled to each of the powered drive wheels, wherein movement of the piston assembly to a disengaged position ceases motorized control of the wheelchair.

4. The invention of claim 1, further including a cooling system comprising at least one cooling fan and at least one venting hole.

5. The invention of claim 3, further including a cooling system comprising at least one cooling fan and at least one venting hole.

6. The invention of claim 2, wherein the controller includes a joystick for directing movement and buttons for starting, stopping, and emergency stopping.

7. The invention of claim 2, wherein the controller utilizes short-range wireless technology to communicate with the powered apparatus.

8. A device for powering a manual wheelchair with rear wheels, comprising:

a powered apparatus providing motorized assistance to a user operating the manual wheelchair, the powered apparatus comprising a motor and pair of powered drive wheels, with each powered drive wheel coupled with a respective rear wheel of the manual wheelchair;

the motor is in contact with a first shaft and first bevel gear that is disassociated from a second shaft and second bevel gear attached to a respective drive wheel; and a piston assembly coupled to each of the powered drive wheels, wherein movement of the piston assembly to a disengaged position ceases motorized control of the wheelchair.

9. The invention of claim 8, further including a controller for operating the powered apparatus.

10. The invention of claim 8, further including a cooling system comprising at least one cooling fan and at least one venting hole.

11. The invention of claim 9, wherein the controller includes a joystick for directing movement and buttons for starting, stopping, and emergency stopping.

12. The invention of claim 9, wherein the controller utilizes short-range wireless technology to communicate with the powered apparatus.

* * * * *